Nov. 19, 1929.   J. H. RYALLS   1,736,627
REVERSIBLE TRANSMISSION FOR SPINNING MULES
Filed Feb. 20, 1926
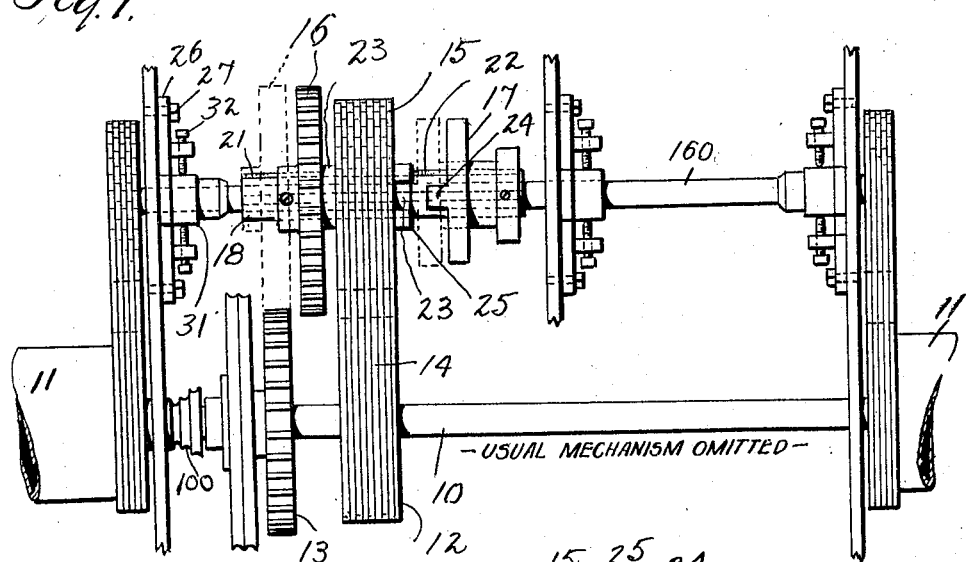
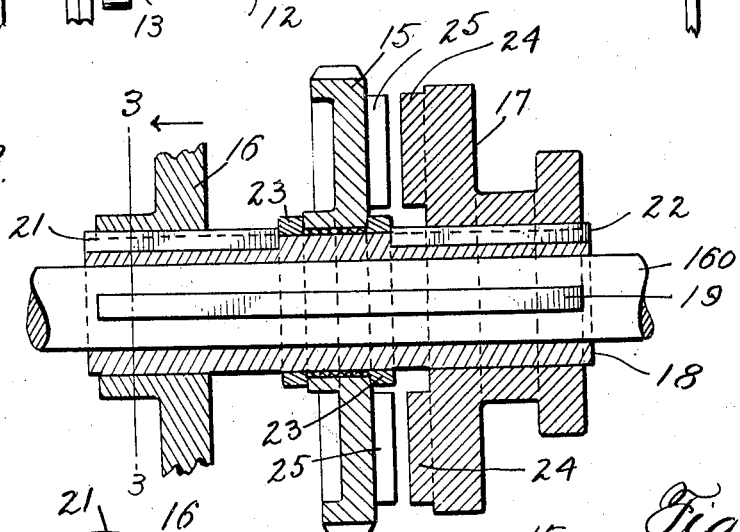
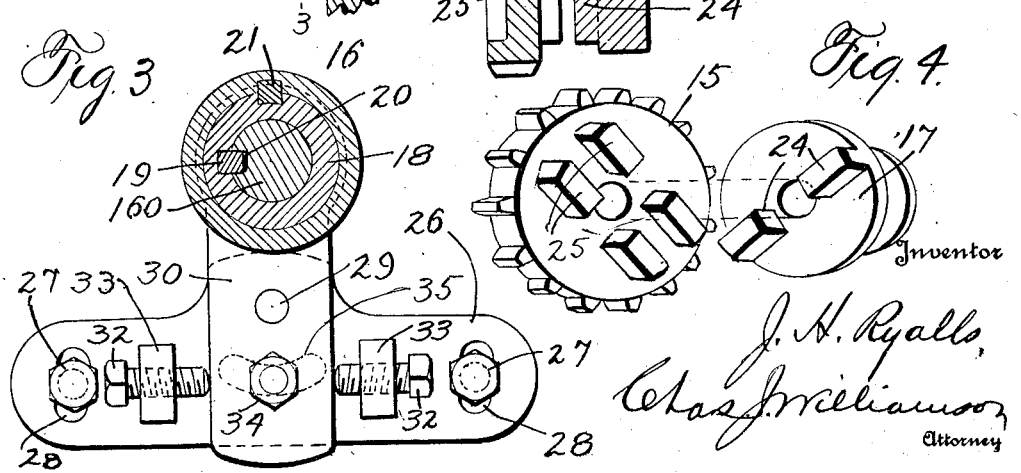

Patented Nov. 19, 1929

1,736,627

UNITED STATES PATENT OFFICE

JOHN HURLEY RYALLS, OF RICHMOND, VIRGINIA, ASSIGNOR TO H. S. HEDGES, OF CHARLOTTESVILLE, VIRGINIA

REVERSIBLE TRANSMISSION FOR SPINNING MULES

Application filed February 20, 1926. Serial No. 89,668.

For many years I have been engaged in the installation of an attachment for spinning mules by which though originally constructed without means for reversing the revolution of the spindles to suit the requirements of right or left twists, the direction of revolution of the spindles may readily be reversed according as a right or left twist is desired. I have taken out numerous patents in that connection, one of such patents being No. 1,396,883 issued November 15, 1921. By reason of the limited space in these very highly organized machines in which to place the reversing attachment, and the power and other difficulties involved in the operation of the machines troublesome problems have arisen. For example, a mule may have five hundred spindles revolving three thousand revolutions per minute, and in reversing this revolution must be stopped, and the spindles started in the opposite direction. Obviously the strains thrown upon the mechanism are very great, tending to displace and break parts of the transmission which by reason of the limitations of the space above mentioned must be made of minimum size. The object of my invention is to provide a transmission construction which will deal with the problems of the kind mentioned, and my invention consists in whatever is described by or is included within the terms or scope of the appended claims.

In the drawings:

Fig. 1 is a top plan view of a Smith and Furbush spinning mule with a reversible transmission embodying my invention, this particular mule being selected merely as one illustration of the application of my invention;

Fig. 2 is a longitudinal section through the jack shaft;

Fig. 3 is a transverse section on the line 3—3 of Fig. 2;

Fig. 4 is a detail view in perspective, shown separated, of the clutch collar and the sprocket wheel to cooperate therewith on the jack shaft.

No specific description need be given of the mechanism mounted on the shaft, 10, which extends between the aligning cylinders, 11, from which bands run to the spindles, beyond mentioning the sprocket wheel, 12, on said shaft and the spur gear, 13, on said shaft and the pulleys, 100, being a driving element. The sprocket wheel, 12, is connected by the sprocket chain, 14, of the silent type with the sprocket wheel, 15, on the jack shaft, and the spur gear, 13, is adapted to directly mesh with a spur gear, 16, on the jack shaft, 160, so that when desired the jack shaft may be driven in opposite directions, either by the sprocket gearing or the spur gearing, and the jack shaft being geared to the two cylinders, the direction of revolution of the latter will be reversed to secure the desired right or left twist.

The spur gear on the jack shaft must be rotatably connected with the jack shaft, though slidable thereon to place it in and out of mesh with the spur gear, 13, on the shaft, 10, and the sprocket wheel on the jack shaft must be loose thereon, but capable of rotatable connection therewith by a slidable clutch collar, 17, which is also rotatably connected with the jack shaft, so that when the spur gear on the jack shaft is out of mesh with its driving gear on the shaft, 10, the sprocket wheel on the jack shaft may be rotatably connected with the jack shaft. The rotatable connection between the slidable spur gear and the jack shaft, and the slidable clutch collar and the jack shaft requires a key way of considerable length cut in the jack shaft for the reception of the key or spline to rotatably connect the jack shaft and the spur gear and the clutch collar. The cutting of such a key way so weakens the jack shaft that under the driving strains involved in transmitting power to so many spindles, it bends or vibrates enough between its bearings to result in crystallizing the steel and the consequent breakage of the shaft. I have solved the problem here presented by placing the slidable spur gear, sprocket chain, and the slidable clutch collar not directly upon the jack shaft, but upon a sleeve, 18, which is connected with the shaft to rotate therewith by a key, 19, set in the key way, 20, cut in the shaft, and splining or keying the slidable spur gear and the slidable clutch collar upon said sleeve by a key, 21, for the slidable spur gear, and a key, 22, for the slidable clutch collar. The sleeve thus surrounds the weakened shaft where it is weakened by the key way, and thus greatly strengthens or reinforces the shaft where it has this element of weakness and in fact makes a stronger structure than the shaft without the key way. The inner ends of the keys, 21 and 22, are spaced apart enough so that the loose sprocket wheel is accommodated, and between the sides of the latter and the ends of the keys are rings or washers, 23, which position the loose sprocket wheel and prevent contact of the sides thereof with the ends of the splines or keys, 21 and 22. The rings or washers, 23, are driven over the sleeve with which they have a driving fit.

The practice heretofore in providing the clutch faces upon the sprocket wheel and the sliding clutch collar has been to provide matching segmental projections and recesses, and this is not only a costly construction requiring tedious hand work, but it interferes with the manipulation of the clutch in a reversing operation, because it is desirable in engaging the clutch faces to be able to see the relative positions of the clutch faces about to be engaged. The clutch forming a part of my present invention comprises simply one radially extending rib or lug on one part, and spaced ribs parallel with the diameter on the other part, such ribs being spaced to allow the snug reception between them of the single rib on the other part. As shown in the drawing, the single radial rib, 24, is on the slidable clutch collar and the spaced parallel ribs, 25, are on the chain wheel. Preferably these ribs are duplicated on diametrically opposite sides of the parts. In manufacture, the two parallel ribs or lugs may be cast as a single piece with the chain wheel, and then by a simple milling operation the space between them provided. And whatever finishing of the single radial rib or lug is necessary can be done by simple machining. Thus, the construction is most inexpensive and the accuracy of standardized construction is secured which is impossible with hand work. Again as the workman looks down upon the clutch faces in the machine he can see when the single radial lug is opposite its space between the two parallel lugs, and thus, can see when to move the clutch collar to engage the clutch. Preferably to give strength, the single radial lug has at its base a fillet or thickening where it joins the fall of the clutch collar.

Under the severe strains from the heavy load upon the sprocket gearing, it is unavoidable that some stretching of the sprocket chain will take place which is a seriously objectionable condition, because of the backlash of lost motion which results. When the stretching of the sprocket chain reaches a degree that can be compensated by the removal of one of the links such removal is the remedy. Before that degree of stretching occurs, however, it is important to compensate for the slack. I accomplish this by providing for each bearing of the jack shaft (there being usually three) an adjustable bearing. The mule frame has no bearing for the jack shaft, the latter being an addition or attachment to the mule, and the bearing that I provide comprises a plate, 26, which by bolts, 27, passing through a vertical slot, 28, near each end into the center carriage frame or the middle center frame is secured to such frame. The slots, 28, are provided to allow for vertical adjustment. The bolts therein rigidly hold the plate, 26, against sidewise motion which would result in lateral shifting of the jack shaft under the strains thereon from the gearing which would tend to cause such motion. Pivoted to the side of the plate, 26, by a substantially centrally located bolt, 29, is a vertically extending arm, 30, which at the upper end has the bearing, 31, for the jack shaft, and below the pivot bolt, 29, is engaged on opposite sides by two opposing adjusting screws, 32, each of which pass through a threaded hole in a lug, 33, on the plate, 26. By means of the two adjusting screws, 32, it will be seen that the arm, 30, may be rocked on the pivot bolt, 29, to take up any slack occurring in the sprocket chain. When the slack has been taken up the bolt, 29, is tightened to clamp the arm, 30, in the adjusted position, and as a matter of precaution a second clamping bolt, 34, below the pivot bolt, 29, is provided, the base plate, 26, being provided with an arcuate slot, 35, to allow the bolt, 34, to move. It will be understood that the bolts, 29 and 34, enter screw holes in the end frames of the mule.

Of course, any swinging of the jack shaft to take up slack in the sprocket chain disturbs the meshing relations of the two spur gears, but this taking up of the slack is done when the sprocket gearing is to do the driving of the cylinders. When the spur gears are to do the driving the bearings of the jack shaft are rocked to secure proper meshing engagement of the spur gears. As the mule may be run for weeks or even months on a right hand or a left hand twist, the occasional adjustment which is called for is not objectionable, and of course, it is more than off-set by the great advantage which comes from the possibility of adjustment to compensate for stretch or slack in the sprocket chain.

What I claim is:

1. In a reversible transmission for spinning mules comprising a jack shaft and oppositely acting gear connections between the jack shaft and the driving shaft, and two slidable members rotatably connected with the jack shaft, a sleeve around the jack shaft, a key way in the jack shaft, a spline in such key way and engaging the sleeve, and a spline connection between the sleeve and each of said sliding members.

2. In a reversible transmission for spinning mules comprising a jack shaft and oppositely acting gear connections between the jack shaft and the driving shaft, and two slidable members rotatably connected with the jack shaft, a sleeve around the jack shaft, a key way in the jack shaft, a spline in such key way and engaging the sleeve, a spline connection between the sleeve and each of said sliding members, one of such members being a spur gear, and the other a clutch collar, and the gearing including a wheel loose on the sleeve between said gear and said clutch collar, and having a face to cooperate with the clutch collar.

3. In a reversible transmission for spinning mules comprising a jack shaft and oppositely acting gear connections between the jack shaft and the driving shaft, and two slidable members rotatably connected with the jack shaft, a sleeve around the jack shaft, a key way in the jack shaft, a spline in such key way and engaging the sleeve, and a spline connection between the sleeve and each of said sliding members, one of such members being a clutch collar, said clutch collar and a wheel of the gearing having cooperating clutch faces comprising a radial rib on one part and spaced parallel ribs on the other part.

4. The combination of parallel shafts, oppositely acting gear connections between the two shafts, two slidable members rotatably connected with one of said shafts, a sleeve around that one of said shafts, a key way in that one of said shafts, a spline in such key way and engaging the sleeve and a spline connection between the sleeve and each of said sliding members.

In testimony whereof I hereunto affix my signature.

JOHN HURLEY RYALLS.